United States Patent Office 3,014,920
Patented Dec. 26, 1961

3,014,920
DODECAHYDROCARBAZOLE AMIDES
Hans Dressler, Pitcairn, and Melvin E. Baum, Pittsburgh, Pa., assignors to Koppers Company, Inc., a corporation of Delaware
No Drawing. Filed June 16, 1959, Ser. No. 820,617
3 Claims. (Cl. 260—315)

This invention relates to certain acylated derivatives of heterocyclic amines. In one specific aspect, it relates to novel dodecahydrocarbazole amides.

Dodecahydrocarbazole, a hydrogenation product of carbazole, is a promising chemical intermediate because of its solvent solubility, relatively low melting point and the basicity of its amino nitrogen. Known derivatives of this interesting compound are relatively few, possibly because of the expense heretofore involved in its preparation. Recent refinements in the hydrogenation of carbazole (which occurs in coal tar to the extent of 2–3 percent in the anthracene fraction thereof) have made dodecahydrocarbazole readily available.

Quite surprisingly, we have found a new class of dodecahydrocarbazole amides which are remarkably effective as plasticizers and antioxidants for polymeric materials.

It is, therefore, an object of the present invention to provide a new class of dodecahydrocarbazole derivatives which are useful as plasticizers for a wide variety of resins and which, in addition, tend to inhibit oxidation of resins containing such derivatives.

In accordance with the invention, we have discovered chemical compounds of the formula:

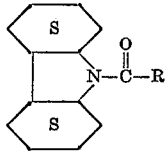

In the formula shown hereabove, R is a substituent chosen from the following group: alkyl having preferably up to 18 carbon atoms, hydrogen, amino, carboxyalkyl, carboxyaryl, carboxyalkenyl, carbalkoxyalkyl, hydroxyalkyl, aminoalkyl, haloalkyl, cyanoalkyl, aralkyl and alkaryl.

The compounds of the invention derive their plasticizing and antioxidant properties from the presence in their structure of the dodecahydrocarbazole nucleus and the acyl group. Their specific physical properties vary to some extent with the group or radical represented by R in the above formula; thus, they range from high-boiling liquids to high-melting crystalline solids depending upon the particular R group which they contain. When they are added to polymeric materials such as polyamides and polystyrene in small amounts, e.g. from 0.05–5 percent by weight they serve as plasticizers with a mild antioxidant effect.

The novel compounds are prepared by reacting dodecahydrocarbazole with at least a stoichiometric quantity of an acylating agent in the presence of a suitable solvent over a wide variety of temperatures and pressures. The mole ratio of reactants used is not critical and thus can be varied widely as desired.

The choice of acylating agent varies with the particular compound desired. Generally, the useful acylating agents comprise esters, acids, acid anhydrides, or acid halides having the desired substituent thereon. For example, to make the compounds wherein R is carboxyalkyl, carboxyaryl or carboxyalkenyl, an acid anhydride is conveniently used. An ester, e.g. methyl formate, is used to prepare compounds wherein R is H. Compounds wherein R is $NH_2$ are readily prepared using as an acylating agent urea or an alkali metal cyanate. Acid chlorides are effective acylating agents for the preparation of compounds wherein R is alkyl. A few specific useful acylating agents and the resulting products are shown below in Table I.

TABLE I

| Acylating Agent | Name of Product | Structure of Product |
|---|---|---|
| Propionyl chloride | 9-Propionyldodecahydrocarbazole. | N—C(=O)—$C_2H_5$ |
| Stearoyl chloride | 9-Stearoyldodecahydrocarbazole. | N—C(=O)—$C_{17}H_{35}$ |
| β-propiolactone | 9-(3-hydroxypropionyl) dodecahydrocarbazole. | N—C(=O)—$C_2H_4OH$ |
| 3-cyanopropionyl chloride. | 9-(3-cyanopropionyl) dodecahydrocarbazole. | N—C(=O)—$C_2H_4CN$ |
| Monochloroacetyl chloride. | Chloroacetyldodecahydrocarbazole. | N—C(=O)—$CH_2Cl$ |

TABLE I—Continued

| Acylating Agent | Name of Product | Structure of Product |
| --- | --- | --- |
| 3-cyanopropionyl chloride followed by reduction. | 9-(4-aminobutyryl) dodecahydrocarbazole. | (structure) |
| Methyl p-toluate | 9-(p-toluyl)dodecahydrocarbazole. | (structure) |
| Phenylacetyl chloride | 9-(phenylacetyl) dodecahydrocarbazole. | (structure) |

Suitable solvents for the reaction include esters, aromatic hydrocarbons and ethers. If an ester is used as the acylating agent, it may also serve as a solvent for the reaction if sufficient excess thereof is present. The reaction temperature is not critical and is limited only by the boiling point of the particular solvent used. It is preferable to use a temperature in the range of 0–200° C. The reaction works well at atmospheric pressure although higher or lower pressures can be used, if desired. The reaction time varies between a few minutes to several hours, depending upon the nature of acylating agent chosen.

Our invention is further illustrated by the following examples.

*Example I*

9-DODECOYLDODECAHYDROCARBAZOLE

A mixture of 251 grams (1.4 moles) of dodecahydrocarbazole, 1600 ml. of xylene and 154 grams (0.7 mole) of lauroyl chloride was stirred and refluxed for 4 hours. After cooling to 25° C., the mixture was filtered. The solvent was washed with 300 ml. of xylene and dried to give 99.2 grams (69 percent yield) of dodecahydrocarbazole hydrochloride. The filtrate was concentrated, cooled to 20° C. and filtered to give an additional 55.5 grams of crude dodecahydrocarbazole hydrochloride. The filtrate was stripped of xylene and the residue was distilled through a 4 inch Vigreux column to give 220 grams of a pale yellow oil (B.P. 247–252°C. at 3 mm. of Hg). The product was identified as 99 percent pure 9-dodecoyldodecahydrocarbazole by nitrogen analysis. The yield was 87 percent of theory. Calculated for $C_{24}H_{43}NO$: N, 3.88; Found: N, 3.84.

*Example II*

9-CARBAMYL-DODECAHYDROCARBAZOLE

A molten mixture of 18 grams (0.1 mole) of dodecahydrocarbazole and 12 grams (0.2 mole) of urea was stirred at 160° C. for 5 hours. The mix was then poured into 100 grams of crushed ice and filtered. The solid was washed with water to remove excess urea. The insolubles were ground under ether and filtered to give 19.6 grams (88 percent yield) of the crude 9-carbamyl-dodecahydrocarbazole. After 3 recrystallizations from aqueous ethyl alcohol, a relatively pure product, M.P. 180–182° C., was obtained.

*Example III*

9-CARBAMYL-DODECAHYDROCARBAZOLE

The hydrochloride of dodecahydrocarbazole was formed by adding 25 ml. of 2 N hydrochloric acid (0.05 mole) to 9 grams (0.05 mole) of dodecahydrocarbazole. The reaction mixture was cooled to 25° C. and 4.1 grams (0.05 mole) of potassium cyanate was added thereto. The mixture was allowed to stand for two hours with occasional stirring. A crystalline solid was filtered off, washed with 50 ml. of water and 25 ml. of ether and then dried to give 8.1 grams (74 percent yield) of 9-carbamyl-dodecahydrocarbazole. After recrystallization from benzene, colorless crystals melting at 167–170° C. were obtained and were shown to be 97 percent pure product by nitrogen analysis. Calculated for $C_{13}H_{22}N_2O$: N, 12.6; Found: N, 12.2.

*Example IV*

9-FORMYLDODECAHYDROCARBAZOLE

A mixture of 36 grams (0.2 mole) of dodecahydrocarbazole and 15 grams (0.25 mole) of methyl formate was refluxed on a steam bath for one hour. The methanol formed during the reaction and excess methyl formate were distilled off. The residue was fractionally distilled to give 21.8 grams (53 percent yield) of 9-formyldodecahydrocarbazole as a colorless liquid boiling at 157–159° C. at 4 mm. of Hg. Calculated for $C_{13}H_{21}NO$: N, 6.77; Found: N, 6.51.

*Example V*

9-(3-CARBOXYPROPIONYL)DODECAHYDROCARBAZOLE

A solution of 18 grams (0.1 mole) of dodecahydrocarbazole, 10 grams (0.1 mole) of succinic anhydride and 25 ml. of ethyl acetate was refluxed for one hour and then held at 5° C. for 16 hours. The product was filtered to give 19 grams (68 percent yield) of colorless crystals melting at 109–114° C. After recrystallization from ethyl acetate, crystals melting at 111–115° C. were obtained. The product was found to be 97 percent pure 9-(3-carboxypropionyl)dodecahydrocarbazole by acid-base titration. Calculated for $C_{16}H_{25}NO_3$: Neutral equivalent, 279; Found: Neutral equivalent, 271.

*Example VI*

9-(3-CARBOMETHOXYPROPIONYL)DODECAHYDROCARBAZOLE

A mixture of 12 grams (0.04 mole) of 9-(3-carboxypropionyl)dodecahydrocarbazole, 50 ml. of methanol and 5 grams of the acid form of a sulfonic acid ion exchange resin (sold commercially as "Dowex-50-X-8") was refluxed on a steam bath for four hours and thereafter filtered. The filtrate was concentrated to remove the methanol and the residue was distilled through a 3 inch "Bantamware" column to give 9 grams (71 percent yield) of a pale yellow viscous oil, B.P. 215–230° C. at 9 mm. of Hg, identified as 9-(3-carbomethoxypropionyl)dodecahydrocarbazole.

Example VII

9-(O-CARBOXYBENZOYL)DODECAHYDROCARBAZOLE

A mixture of 15 grams (0.1 mole) of phthalic anhydride and 18 grams (0.1 mole) of dodecahydrocarbazole was dissolved in 50 ml. of ethyl acetate and heated on a steam bath for 2 hours. After cooling to 5° C., the mixture was filtered to give 24.2 grams (74 percent yield) of a colorless solid melting at 182–187° C. After recrystallization from 50 percent ethyl alcohol, crystals melting at 207–209° C. were obtained. The product was found to be 97 percent pure 9-(O-carboxybenzoyl)dodecahydrocarbazole by acid-base titration. Calculated for $C_{20}H_{25}NO_2$: Neutral equivalent, 327; Found: Neutral equivalent, 337.

Example VIII

9-(ω-CARBOXYACRYLYL)DODECAHYDROCARBAZOLE

A solution of 18 grams (0.1 mole) of dodecahydrocarbazole and 10 grams (0.1 mole) of maleic anhydride in 25 ml. of ethyl acetate was refluxed for one hour, then cooled to 5° C. and held for 16 hours. After filtering, 14 grams of a colorless solid (50 percent yield) melting at 122–126° C. was obtained. After recrystallization from ethyl acetate the product melted at 124–129° C. By acid-base titration it was shown to be 97 percent pure 9-(ω-carboxyacrylyl)dodecahydrocarbazole having the formula shown below.

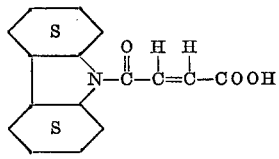

Calculated for $C_{16}H_{23}NO_3$: Neutral equivalent, 277; Found: Neutral equivalent, 270.

We have thus provided a new generic class of dodecahydrocarbazole amides. In addition to their uses as plasticizers and antioxidants, these interesting compounds show promise as lubricants, thickening agents and textile adjuvants. Thus, the compounds of the invention, particularly those wherein R is carboxyalkyl, carboxyaryl, carboxyalkenyl, carbalkoxyalkyl and hydroxyalkyl, can be added to textile-treating baths in amounts ranging between 0.25 and 2 percent to impart antistatic properties to the textiles being treated. Certain of the compounds, e.g. 9-carbamyl-dodecyahydrocarbazole, are excellent lubricants and thickening agents. For example, they can be admixed with styrene-maleic anhydride copolymers in an amount ranging about e.g. 1–5 percent to provide a useful thickener for paints, varnishes and the like. The 9-formyl dodecahydrocarbazole is an excellent high-boiling solvent, especially for nitro compounds.

We claim:
1. A compound of the formula:

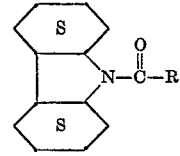

wherein R is a member selected from the group consisting of carboxy lower alkyl, carboxy lower alkenyl, carbalkoxy lower alkyl, hydroxy lower alkyl, cyano lower alkyl and amino lower alkyl.

2. 9-carbamyl-dodecahydrocarbazole.
3. 9-(3-carboxypropionyl)dodecahydrocarbazole.

References Cited in the file of this patent

UNITED STATES PATENTS

| | | |
|---|---|---|
| 2,288,197 | Kranzlein et al. | June 30, 1942 |
| 2,415,356 | Kellog et al. | Feb. 4, 1947 |
| 2,576,106 | Cusic | Nov. 27, 1951 |

OTHER REFERENCES

Beilstein: "Handbuch der Organische Chemie," vol. 20, page 54 of Hauptwerk (1910).
Beistein: "Handbuch der Organische Chemie," vol. 20, page 16 of 1st Supp. (1919).
Beilstein: "Handbuch der Organische Chemie," vol. 20, page 36 of 2nd Supp. (1929).
Deutsche Chemische Gesellschaft-Berichte, vol. 67 (1934), page 708, 709.
Beilstein: Handbuch der Organischen Chemie, H.W., page 436, page 437 (1935).
Beilstein: Handbuch der Organischen Chemie, 1st Supp. page 284 (1935).
Campbell et al.: Chemical Reviews, vol. 40, pages 359–80 (1947).
Annalen der Chemie, vol. 582, pages 14–15 (1953).
Beilstein: Handbuch der Organischen Chemie, 2nd Supp., page 165, page 166, 4th ed., (1953).
Chemical Abstracts, vol. 46, page 12413 (1952).
Sumpter et al.: "The Chemistry of Heterocyclic Compounds" (1954), vol. 8, page 105.
Sumpter et al.: The Chemistry of Heterocyclic Compounds, (1954), vol. 8, page 99.